United States Patent [19]

Gidge

[11] 4,062,145

[45] Dec. 13, 1977

[54] MULCH CARPET AND METHOD FOR MAKING SAME

[75] Inventor: Lester Gidge, Nashua, N.H.

[73] Assignee: Terra-Tex Corporation, Nashua, N.H.

[21] Appl. No.: 752,795

[22] Filed: Dec. 20, 1976

Related U.S. Application Data

[63] Continuation-in-part of Ser. No. 601,275, Aug. 4, 1975, abandoned, which is a continuation-in-part of Ser. No. 433,861, Jan. 16, 1974, abandoned, which is a continuation-in-part of Ser. No. 160,425, July 7, 1971, abandoned.

[51] Int. Cl.² .................................... A01G 7/00
[52] U.S. Cl. .................................... 47/9; 47/32; 156/243; 156/246
[58] Field of Search .................. 156/243, 246; 47/9, 47/32

[56] References Cited

U.S. PATENT DOCUMENTS

| | | | |
|---|---|---|---|
| 2,243,857 | 6/1941 | Fischer | 47/9 |
| 2,842,897 | 7/1958 | Finn | 47/9 |
| 2,881,066 | 4/1959 | Sproull et al. | 47/9 UX |
| 2,909,003 | 10/1959 | Marshall | 47/56 |
| 2,949,698 | 8/1960 | Downey et al. | 47/9 |
| 3,867,250 | 2/1975 | Jankowiak et al. | 47/9 X |
| 3,870,583 | 3/1975 | Gidge | 47/9 X |

Primary Examiner—Robert E. Bagwill
Attorney, Agent, or Firm—Pearson & Pearson

[57] ABSTRACT

A flexible, opaque mulch carpet for inhibiting weed growth while promoting plant growth has a central backing layer of non-rotting, synthetic, open mesh, fabric of relatively high tensile strength sandwiched between an upper layer and a lower layer formed of ground bark particles unified by, and each encapsulated in, a resin binder, preferably PVC. The thin coating of resin binder on the particles bonds the particles together, and bonds the layers together through the mesh, but the particles are uncompressed and water can percolate through the interstices between the coated particles. Iron oxide in the mix makes fast the color of the particles.

11 Claims, 6 Drawing Figures

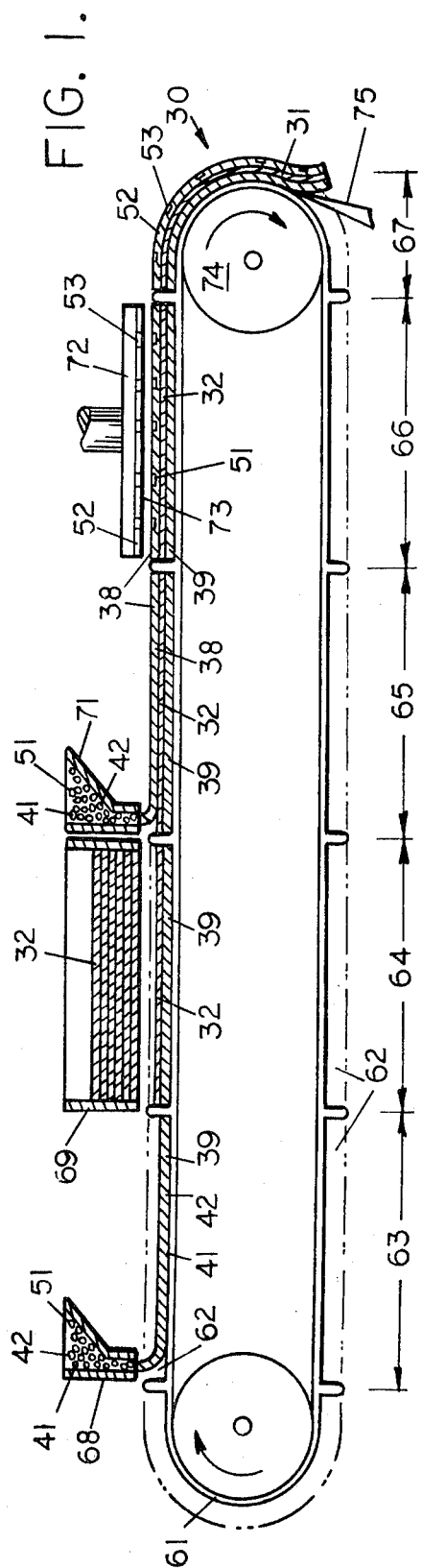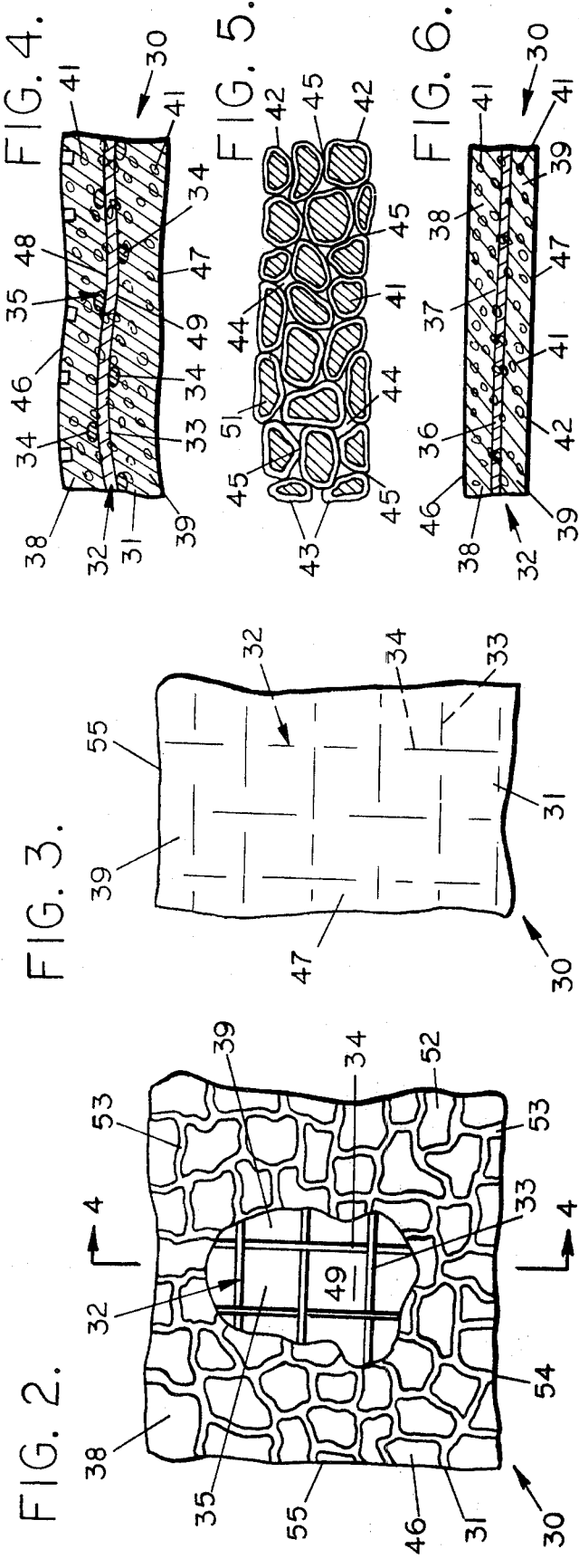

MULCH CARPET AND METHOD FOR MAKING SAME

RELATED APPLICATIONS

This application is a continuation-in-part of application Ser. No. 601,275, filed Aug. 4, 1975 and now abandoned, which was a continuation-in-part of application Ser. No. 433,861, filed Jan. 16, 1974 and now abandoned, which was a continuation-in-part of application Ser. No. 160,425, filed Jul. 7, 1971 and now abandoned. Application Ser. No. 352,040, filed Apr. 17, 1973, now U.S. Pat. No. 2,870,583, was a division of aforementioned application Ser. No. 160,425.

BACKGROUND OF THE INVENTION

It has heretofore been proposed as in U.S. Pat. No. 2,909,003 to Marshall of Oct. 20, 1959, to provide a grass seed mat with a layer of compressed textile fibers containing grass seed locked in the compacted fibers thereof, the fibrous layer being covered on one or both sides by layers of water permeable material and the mat permitting free passage of water.

It has also been proposed in U.S. Pat. No. 2,822,644 to Berger of Feb. 11, 1958, to provide a plant protector for encircling a tree, the protector being formed of thin, resilient water impervious material having annular, concentric ribs and grooves, with drainage apertures in the bottoms of the grooves. A similar tree collar, or protector, is disclosed in U.S. Pat. No. 3,305,969 to Mattson of Feb. 28, 1967, the slit collar having a lower layer of compressibly, resilient porous material and an upper layer of thin plastic film, impervious to passage of moisture in a dished configuration.

Mulch carpets permitting free passage of water not only tend to let rain wash out beneath the mulch but also permit moisture to freely evaporate through the mulch to thereby dry out the ground around the plants. On the other hand, mulch which does not permit passage of any water, or transpiration of any moisture except at a central cut out, tends also to dry out the ground and deny water to rootlets located away from the cut outs.

SUMMARY OF INVENTION

In this invention, as in my prior application mentioned above, the basic material of the mulch carpet is ground bark particles. Natural tree bark has a cellular structure, provided it is not crushed, or compressed, which gives an ideal natural insulation and tree bark contains natural preservatives so that it does not rot, decompose or pulverize readily. The ground bark particles are mixed with a resin binder, preferably PVC in a proportion by volume of about 95 to 5 percent, whereby each particle is fully, or substantially, encapsulated in a thin, microscopic, coating but the coated particles are not unduly compressed and compacted but touch only at certain faces, with interstices between the particles, which allow water to percolate, or slowly ooze therethrough.

A strong backing of non-rotting, synthetic, fibers or ribbons which is preferably woven of polypropylene tape at about a three quarters of an inch mesh size, or a similar open mesh, forms the central layer with an upper layer and a lower layer of the resin coated bark particles forming a unitary, flexible, opaque, sandwich therewith. p Thus, the mulch carpet permits slow percolation of water, through the interstices after an initial wetting, while providing a mulch of natural, organic, insulation which easily conforms to ground configuration around trees and plants and which can be easily slit to size.

Preferably the upper surface of the upper layer has a random pattern of mounds and grooves, the grooves extending laterally and longitudinally to open ends at the edges of the mulch and not only making cutting and flexing easier, but also tending to spread out rainfall to the edges while allowing some rainfall to percolate through the interstices in the mulch. Preferably also iron oxide is added to the resin bark mix to assist in retaining the deep, rich, dark reddish brown color, or hue, of the ground bark.

BRIEF DESCRIPTION OF THE DRAWING

FIG. 1 is a diagrammatic side elevation showing the steps of the method of the invention;

FIG. 2 is a top plan view of a fragment of the mulch carpet of the invention with parts broken away;

FIG. 3 is a bottom plan view thereof;

FIG. 4 is a side elevation of the preferred embodiment of the invention in section on line 3—3 of FIG. 2;

FIG. 5 is a greatly enlarged fragmentary, diagrammatic side elevation in section showing the thin coated bark particles and the interstices therebetween; and FIG. 6 is a view similar to FIG. 4 of another embodiment of the invention.

DESCRIPTION OF THE PREFERRED EMBODIMENT

The mulch carpet 30 of this invention is a unitary, multilayered, flexible opaque web 31 which may be of any dimensions desired and may be formed, or cut, into angular, or circular, plant or tree protectors. It is flexible and limp enough to conform to the configuration of the ground adjacent a plant, or tree, and to be easily rolled up for storage or shipment without fracture or breakage.

The web 31 includes a central backing 32 which is of non-rotting, synthetic material such as a scrim, or woven fabric, formed of polypropylene ribbons, with the warp 33 and filling 34 spaced apart about three quarters of an inch so as to form open meshes 35. As shown in FIG. 6, the backing layer 32 may also be a non-woven, felted or bonded mat 36 of nylon fibers 37, the woven backing 32, or non-woven mat 36 being of relatively high tensile strength and being porous, or water permeable. Open meshed wire screening, or equivalent flexible materials of substantial tensile strength may also be used as the central backing of the web.

The flexible, unitary web 31 also includes an upper layer 38, and a lower layer 39 each on an opposite side of central layer 32 and firmly bonded thereto to form a sandwich therewith.

Upper layer 38, and lower layer 39 are each formed of ground wood particles 41 mixed with a resin binder 42, such as PVC in the proportions by volume of about 95 to 5%. For example: Five bushels of wood particles may be mixed with one peck of PVC. Thus the wood particles 41 are each substantially encapsulated in a thin, microscopic coating 43 of the resin binder and are unified into a cohesive layer by the resin binder. However, the particles, and the heated layers, are not compacted, compressed or in any way subjected to pressure sufficient to crush the natural wood bark cellular structure and thereby destroy the natural insulation thereof or drive out the natural preservatives therein. They also are not subjected to any pressure sufficient to destroy the interstices 44 between the thin coated bark particles (FIG. 5), so that the coated particles merely touch and adhere at spaced areas 45 without blocking the slow percolation, or oozing passage of water through the web from upper surface 46 to lower surface 47.

The thin coating 43 of resin binder 42 not only unifies, and bonds the ground bark particles 41 of each layer to each other, but also binds the juxtaposed particles 41 in the inner surfaces 48 and 49 to each other through the mesh 35 of the backing layer 32.

The upper layer 38 and the lower layer 39 are preferably of substantially identical thickness such as one eighth of an inch and therefore have substantially identical coefficients of expansion and growth when wet. Thus the mulch carpet does not tend to curl, or hump, to become unsightly and inefficient under the influence of time, sunlight, moisture, cold or the like and remains flat throughout the year.

Preferably the upper, or exposed face 46 of the upper layer 38 is molded in a random pattern of irregular shaped and sized mounds 52 separated by shallow, irregular shaped and sized grooves 53, to collect rainfall and permit it to slowly run off the open ends 54 of the grooves in the peripheral edges 55 of the web while permitting some of the water to slowly percolate through the carpet from upper face 46 to the lower, exposed substantially flat planar face 47 of the carpet.

Preferably iron oxide 51 is added to the bark, resin mix because it has been found to retain and impart a deep reddish brown color, or hue, to the carpet which is retained for a substantial length of time.

In the method of this invention ground bark is heated in a ribbon mixer or other tumbling or blending devices to a minimum of 250° F - Maximum 350° F, then resin (P.V.C. highly plasticized) is added cold, either in (pellet granular) form, finely ground form, chunk form, or in a preheated state that has brought the resin to a liquid. The resin is mixed long enough to reach a temperature that brings it to a viscous state until each particle has a thin microscopic coating or latice covering itself. This thin coating bonds to the bark particle and to itself to produce the product when pressed together.

The resin or resins are thermostatic in nature and have elastomeric qualities at the range of outdoor temperatures experienced in the U.S.A. and in this range never reach a state of embrittlement. These elastomeric qualities allow the product to flex without breaking as well as expand and contract under wet and dry conditions.

Any of the thermoplastics or combination of thermoplastics that have controllable degrees of plasticity (softness) at outdoor temperatures can be utilized. P.V.C. is mentioned as it is one of the workhorses in this area.

To emphasize the thinness of this coating by dry measure, ½ bushel of resin approximately is providing a coating for 5 bushels of bark particles.

To form the mulch carpet, an endless conveyor 61 has a plurality of recesses 62 spaced therealong which are advanced intermittently along a horizontal path through five zones 63, 64, 65, 66 and 67.

A first heated layer 39 of ground bark particles 41 encapsulated in resin binder 42, which is preferably polyvinyl chloride, is deposited in a recess 62 from the nozzle of a heated hopper 68 in the first zone 63. A pre-shaped backing fabric 32 is deposited on layer 39 from a hopper 69 in the second zone 64. A second heated layer 38 of ground particles 41 encapsulated in resin binder 42 also preferably PVC is deposited from heated hopper 71 in zone 65. A reciprocating plunger 72 having a random pattern 73 of the mounds 52 and grooves 53 thereon, descends in zone 66 to lightly impress the pattern in the upper surface 51, thereby adhering and firmly bonding the three layers without damaging the cell structure, or closing the interstices 44. Thereafter each mulch carpet 30 is stripped from the conveyor in zone 67 by the travel around the end stretch 74 combined with a stripper blade 75.

I claim:

1. A mulch carpet for covering, and conforming to the shape of, the ground adjacent trees or plants to inhibit weed growth while promoting tree and plant growth said carpet comprising:

a unitary, multi-layered, flexible, opaque, web, having a central, water permeable backing sandwiched between, and firmly bonded to, an upper layer and a lower layer;

said upper and lower layers being formed of ground bark particles, unified by, and each substantially encapsulated in, a thin coating of resin binder, the coated bark particles being adhered to each other by said binder; having interstices therebetween for the percolation of water therethrough and being uncompressed to preserve their natural insulation properties.

2. A mulch carpet as specified in claim 1 wherein:
the ground bark particles and the resin binder in said upper and lower layers bear the relationship of about 95 to 5 percent by volume.

3. A mulch carpet as specified in claim 1 wherein:
said upper and lower layers are each of predetermined substantially identical thickness to each exhibit substantially identical coefficients of expansion.

4. A mulch carpet as specified in claim 1 wherein:
said upper layer includes an upper surface having a random pattern of mounds, separated by grooves, said grooves extending both laterally and longitudinally of said web to open ends at the edges thereof.

5. A mulch carpet as specified in claim 1 wherein:
said backing layer is formed of an open, mesh weave of polypropylene ribbon, the mesh thereof being at least one quarter inch in area.

6. A mulch carpet as specified in claim 1 wherein:
said backing layer is formed of a non-woven mat of bonded synthetic fibers, said mat being of relatively high tensile strength.

7. A mulch carpet as specified in claim 1 plus:
iron oxide mixed with said ground wood bark particles and resin binder of said upper and lower layers whereby the color of said particles and of said carpet remains fast despite exposure to the sun and elements.

8. A mulch carpet for use in inhibiting weed growth while promoting plant and tree growth, said carpet comprising:

a flexible, unitary, web having a central, water-permeable, open mesh backing of substantial tensile strength;

and an upper and lower flexible layer of ground wood bark particles, each substantially encapsulated with a thin coating of resin binder, and unified thereby, free of compression, to retain the natural insulative qualities of the bark said coated bark particles having interstices therebetween for the percolation of water, through said layers, said resin binder bonding said upper and lower layers together through the mesh of said backing.

9. A mulch for covering the ground around plants said mulch comprising:
    a multilayered, unitary, limp flexible web formed of an upper and a lower layer of ground bark particles each on an opposite side of a central flexible backing of synthetic, porous material;
    said bark particles and said layers being bonded to each other by a resin binder
    said particles being each substantially encapsulated in said binder with interstices therebetween and
    said upper layer having a random pattern of mounds and grooves therein, said grooves extending to open ends at the edges of said web.

10. A method for making a flexible, opaque, water permeable mulch carpet which comprises the steps of:
    advancing a horizontal stretch of an endless conveyor along a horizontal path
    depositing a first heated layer of ground bark particles each substantially encapsulated in a resin binder on said conveyor in a first zone;
    then depositing a layer of flexible, water permeable backing material on said first layer in a second zone;
    then depositing a second heated layer of said ground bark particles, each substantially encapsulated in a resin binder on said backing layer in a third zone;
    the substantially encapsulated bark particles in said layers being adhered to each other with interstices therebetween
    and then stripping the resulting three layered product from said conveyor in a discharge zone.

11. A process as specified in claim 10 plus:
    the step of applying a pattern of mounds and grooves in the upper, exposed, face of said second layer, with controlled pressure to avoid compressing said particles, in a fourth zone located between said third zone and said discharge zone.

* * * * *